United States Patent
Lee

(10) Patent No.: US 11,095,692 B2
(45) Date of Patent: Aug. 17, 2021

(54) METHOD FOR TRANSMITTING CONTENT ON HETEROGENEOUS NETWORK AND APPARATUS THEREFOR

(71) Applicant: SK TELECOM CO., LTD., Seoul (KR)

(72) Inventor: Jongmin Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 16/503,880

(22) Filed: Jul. 5, 2019

(65) Prior Publication Data

US 2019/0334955 A1    Oct. 31, 2019

Related U.S. Application Data

(63) Continuation of application No. PCT/KR2017/005317, filed on May 23, 2017.

(30) Foreign Application Priority Data

Jan. 6, 2017 (KR) .................. 10-2017-0002257
Jan. 10, 2017 (KR) .................. 10-2017-0003835

(51) Int. Cl.
    *H04L 29/06*      (2006.01)

(52) U.S. Cl.
    CPC ...... *H04L 65/1069* (2013.01); *H04L 65/1003* (2013.01); *H04L 65/4076* (2013.01); *H04L 69/16* (2013.01)

(58) Field of Classification Search
    CPC ............. H04L 65/1069; H04L 65/1003; H04L 65/4076; H04L 69/16
    See application file for complete search history.

(56) References Cited

U.S. PATENT DOCUMENTS

| | | | | |
|---|---|---|---|---|
| 8,381,301 | B1* | 2/2013 | Wilson ................. | H04L 43/026 726/24 |
| 2003/0063752 | A1* | 4/2003 | Medvinsky ......... | H04L 63/0457 380/279 |
| 2007/0223443 | A1* | 9/2007 | Wang ................. | H04L 65/1006 370/349 |
| 2010/0023625 | A1* | 1/2010 | Lee ...................... | H04L 67/147 709/227 |
| 2010/0107205 | A1* | 4/2010 | Foti .................... | H04L 65/1083 725/109 |

(Continued)

FOREIGN PATENT DOCUMENTS

| | | | |
|---|---|---|---|
| JP | 2008158575 A | * | 7/2008 |
| KR | 10-2011-0117302 A | | 10/2011 |

(Continued)

*Primary Examiner* — Christopher B Robinson
(74) *Attorney, Agent, or Firm* — Fenwick & West LLP

(57) ABSTRACT

The present invention relates to a method and an apparatus for transmitting content for a streaming service and can provide streaming content without delay even in a heterogeneous mobile network environment utilizing NAT technology, by transmitting and receiving a session key and UDP port information for transmitting the content using a UDP method through a TCP session, generating a UDP session between a terminal device and a content providing device, and providing the streaming content requested from the terminal device through the generated UDP session.

6 Claims, 5 Drawing Sheets

(56) References Cited

U.S. PATENT DOCUMENTS

| | | | | |
|---|---|---|---|---|
| 2010/0122303 A1* | 5/2010 | Maloney | ............ | G06Q 30/0255 |
| | | | | 725/87 |
| 2011/0107379 A1* | 5/2011 | Lajoie | ................ | H04L 65/1016 |
| | | | | 725/87 |
| 2014/0344875 A1* | 11/2014 | Bae | ................ | H04N 21/234327 |
| | | | | 725/109 |
| 2015/0009956 A1* | 1/2015 | Kweon | ................ | H04L 65/608 |
| | | | | 370/331 |
| 2015/0295982 A1* | 10/2015 | Kafle | ...................... | H04L 69/18 |
| | | | | 709/219 |
| 2015/0358363 A1* | 12/2015 | Park | ........................ | H04L 12/12 |
| | | | | 709/227 |

FOREIGN PATENT DOCUMENTS

| KR | 10-2011-0119229 A | 11/2011 |
|---|---|---|
| KR | 10-2013-0137923 A | 12/2013 |
| KR | 10-1395405 B1 | 5/2014 |
| KR | 10-2014-0099976 A | 8/2014 |
| WO | WO 2016/129965 A1 | 8/2016 |
| WO | WO 2018/128226 A1 | 7/2018 |

* cited by examiner

FIG. 6

| Syntax | Values | No. of bits | Mnemonic |
|---|---|---|---|
| SN_message ( ) { | | | |
|    message_id | | 16 | uimsbf |
|    version | | 8 | uimsbf |
|    length | | 16 | uimsbf |
| | | | |
|    message_payload{ | | | |
| | | | |
|      session_Key | | 32 | uimsbf |
|      asset_id(){ | | | |
|        asset_id_scheme | | 32 | uimsbf |
|        asset_id_length | N | 8 | uimsbf |
|        for (j=0; j<N; j++) { | | 8 | uimsbf |
|           asset_id_byte | | | |
|           } | | | |
|      } | | | uimsbf |
|      MPU_seq | | 32 | uimsbf |
|      Packet_id | | 16 | uimsbf |
|      Packet_sequence_number | | 32 | uimsbf |
|      IP_address | | 32 | uimsbf |
|      port_number | | 32 | uimsbf |
|      protocol | | 16 | bslbf |
|      retry_flag | | 1 | |
|    } | | | |
| } | | | |

FIG. 7

| Syntax | Value | No. of bits | Mnemonic |
|---|---|---|---|
| SN_message () { | | | |
|     message_id | | 16 | uimsbf |
|     version | | 8 | uimsbf |
|     length | | 16 | uimsbf |
|     message_payload{ | | | |
|         ip_addr_version | | 2 | uimsbf |
|         reserved | '11 1111' | 6 | uimsbf |
|         MMT_package_id { | | | |
|             MMT_package_id_length | N1 | 8 | uimsbf |
|             for (i=0; i<N1; i++) { | | | |
|                 MMT_package_id_byte | | 8 | uimsbf |
|             } | | | |
|         } | | | |
|         if (ip_addr_version == 00) { | | | |
|             ipv4_src_addr | | 32 | uimsbf |
|         } else if (ip_addr_version == 01) { | | | |
|             ipv6_src_addr | | 128 | uimsbf |
|         } | | | |
|         src_port | | 16 | uimsbf |
|         mobile_info_descriptor() | | | |
|     } | | | |
| } | | | |

METHOD FOR TRANSMITTING CONTENT ON HETEROGENEOUS NETWORK AND APPARATUS THEREFOR

CROSS-REFERENCE TO RELATED APPLICATIONS

The present application is a continuation-in-part of International Patent Application No. PCT/KR2017/005317, filed on May 23, 2017, which is based upon and claims the benefit of priorities to Korean Patent Application No. 10-2017-0002257, filed on Jan. 6, 2017, and Korean Patent Application No. 10-2017-0003835, filed on Jan. 10, 2017. The disclosures of the above-listed applications are hereby incorporated by reference herein in their entirety.

TECHNICAL FIELD

The present disclosure relates to a content transmission method and apparatus for a streaming service. Particularly, the present disclosure relates to a content transmission method and apparatus capable of providing a low-delay broadcast service even to a user using a home Wi-Fi or router based on NAT technology through an adaptive content transmission scheme according to a network type of provides a streaming service.

BACKGROUND ART

Descriptions made in this section merely provide background information of embodiments of the present disclosure and do not constitute conventional art.

In the past, consumers consumed broadcast contents through TV. Recently, as the trend of consuming broadcast contents has moved from viewing TV to using mobile devices, mobile video streaming traffic has been increasing explosively.

However, a mobile live streaming service has a problem of causing a considerable delay (e.g., 30 seconds) as compared with an original video of a streaming service provider. The main reasons for this delay are that a typical adaptive streaming scheme needs a manifest file provided in response to a request for a series of video chunks and also uses a TCP congestion control technique to stably receive a data stream through a retransmission of a packet.

In order to solve such a problem and provide broadcast contents in substantially real time with a small overhead and a reduced delay time, a technique to transmit broadcast contents in a UDP scheme using an MPEG media transport protocol (MMTP) may be considered. This broadcast content transmission scheme of UDP type has, however, a problem of NAT traversal in a heterogeneous mobile network. As a result, it is difficult to provide a low-delay broadcast service to a user who uses Home Wi-Fi or router.

SUMMARY

In order to solve the above-discussed problems, the disclosure addresses a content transmission method and apparatus for a streaming service capable of providing streaming content without a delay in a mobile environment that utilizes NAT technology.

Specifically, in order to provide streaming content without a delay even in a mobile environment that utilizes NAT technology, the present disclosure addresses a content providing device that establishes a TCP session with a terminal device to control streaming transmission, registers a UDP session for content transmission by transmitting a session key for authentication and session information for UDP transmission to the terminal device, and transmits streaming content through the registered UDP session when a request for streaming content transmission is received from the terminal device.

However, the present disclosure is not limited to the above objects, and any other object, even though not mentioned herein, may be well understood from the following description.

In order to accomplish the above objects, a content providing method of a content providing device according to the present disclosure may include transmitting first session information to a terminal device through a first session; receiving second session information from the terminal device through a second session; registering the second session information, based on the first session information; and providing requested content to the terminal device through the second session, based on the registered second session information, when receiving a content transmission request from the terminal device through the first session.

In the method, the first session may be a transmission control protocol (TCP) session for transmission of control information required for content transmission, and the second session may be a user datagram protocol (UDP) session for the content transmission.

In the method, the session information may contain at least one of a port number, IP address information, session identification information for authentication of a session between the terminal device and the content providing device, content identification information, a packet group sequence number, packet ID information, a packet sequence number, protocol information, and retry indication information, and the session identification information may be a session key or identification information of the terminal device.

In the method, the registering the second session information may include comparing the session identification information contained in the second session information received from the terminal device through the second session with the session identification information contained in the first session information transmitted through the first session, and registering the second session information when the session identification information contained in the second session information is identical with the session identification information contained in the first session information.

In the method, the providing requested content may include providing the content composed of an MPEG media transport (MMT) packet including at least one media fragment unit (MFU), which is a minimum decoding unit contained in a payload of the packet, or at least one media processing unit (MPU) which includes the at least one MFU. The content identification information may indicate asset ID information or package ID information, and the packet group sequence number may indicate an MPU sequence number.

The method may further include, when transmission of the requested content is stopped at the content providing device for a predetermined time after the providing requested content, receiving again the second session information from the terminal device; updating the registered second session information, based on the received second session information; and providing content to the terminal device through the second session, based on the updated second session information.

In order to accomplish the above objects, a content receiving method of a terminal device according to the present disclosure may include establishing a first session with a content providing device to transmit control information required for content transmission; receiving first session information from the content providing device through the first session; transmitting second session information to the content providing device through a second session; registering the second session information, based on the first session information; receiving requested content from the content providing device through the second session, based on the registered second session information, by transmitting a content transmission request to the content providing device through the first session; retransmitting the second session information to the content providing device when transmission of the requested content is stopped at the content providing device for a predetermined time; and receiving the requested content through the second session, based on the second session information updated using the retransmitted second session information.

In addition, the present disclosure may provide a non-transitory computer-readable recording medium storing a program for executing the above-described method.

Also, the present disclosure may provide a computer program stored in a non-transitory computer-readable recording medium, the computer program being implemented to execute the above-described method.

In order to accomplish the above objects, a content providing device of the present disclosure may include a communication module configured to transmit and receive data to and from a terminal device via a communication network; and a control module configured to transmit first session information to the terminal device through a first session, to receive second session information from the terminal device through a second session, to register the second session information, based on the first session information, and provide requested content to the terminal device through the second session, based on the registered second session information, when receiving a content transmission request from the terminal device through the first session.

According to the present disclosure, a session key and UDP port information for content transmission in a UDP scheme are transmitted and received through a TCP session, and then a UDP session is generated between a terminal device and a content providing device. In addition, streaming content requested by the terminal device is provided through the generated UDP session. Therefore, it is possible to provide streaming content without a delay even in a heterogeneous mobile network environment that utilizes NAT technology.

Particularly, even in a situation where a transmission environment is changed, such as a handover, it is possible to transmit streaming content seamlessly in the UDP scheme.

Other various advantages and effects will be disclosed explicitly or implicitly in embodiments of this disclosure to be described below in detail.

BRIEF DESCRIPTION OF DRAWINGS

FIG. 6 is a diagram illustrating the syntax of a session notification message for UDP session registration according to one embodiment of the present disclosure.

FIG. 7 is a diagram illustrating the syntax of a session notification message for UDP session registration according to another embodiment of the present disclosure.

DETAILED DESCRIPTION

Figure 1:
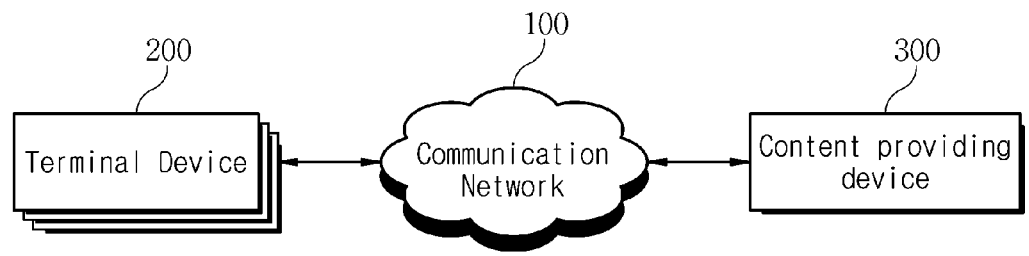
FIGS. 1 and 2 are diagrams illustrating a main configuration of a content providing system according to an embodiment of the present disclosure.

Hereinafter, embodiments of the present disclosure will be described in detail with reference to the accompanying drawings.

In the following description and the accompanying drawings, well-known functions or elements may not be described or illustrated in detail to avoid obscuring the subject matter of the present disclosure. The same elements may be denoted by the same reference numerals throughout the drawings.

The terms and words used herein should not be construed as limited to ordinary or dictionary definition terms, but should be construed in light of the meanings and concepts consistent with the subject matter of the present disclosure on the basis of the principle that the inventor can properly define his own disclosure as the concept of the term to describe it in the best way. It is therefore to be understood that embodiments disclosed herein are merely exemplary and various equivalents or modifications thereof are possible.

In addition, expressions including ordinal numbers such as "first" and "second" may indicate various elements. The above expressions do not limit the sequence or importance of the elements, and are used merely for the purpose to distinguish one element from the others. For example, without departing from the scope of the present disclosure, a first element may be referred to as a second element, and similarly a second element may be also referred to as a first element.

Terms used herein may be merely to describe a certain embodiment, and may not be intended to limit the disclosure. The singular expressions may include plural expressions unless the context clearly dictates otherwise. In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In addition, the term "module" or "unit" used herein may refer to an element for performing at least one particular function, operation, or task and may be implemented by software and/or hardware. Also, in the following description, especially in claims, the terms "a", "an", "one", and "the" may be used as both singular and plural meanings unless the context clearly indicates otherwise.

In addition, the terms used herein are only examples for describing a specific embodiment and do not limit various embodiments of the present disclosure.

In addition, embodiments within the scope of the present disclosure include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the following description and claims, it is assumed that the technical background for implementing a method and apparatus for streaming content transmission in a heterogeneous network is an MPEG media transport (MMT).

However, this is only an example for convenience of understanding the present disclosure, and the present disclosure is not necessarily limited to the MMT technology.

Now, a method for transmitting streaming content over a heterogeneous network in a system according to an embodiment of the present disclosure will be described in detail with reference to the drawings.

FIG. 1 is a diagram illustrating the configuration of a streaming content transmission system according to an embodiment of the present disclosure.

Referring to FIG. 1, the streaming content transmission system according to an embodiment of the present disclosure may include a content providing device 300 and a terminal device 200, which may be connected to each other through a communication network 100.

Hereinafter, the above elements will be described with reference to FIG. 1.

The communication network 100 performs data transmission/reception between the terminal device 200 and the content providing device 300. Based on a system implementation type, the communication network 100 may use wired communication schemes, such as Ethernet, xDSL (ADSL, VDSL), HFC (Hybrid Fiber Coaxial cable), FTTC (Fiber to the Curb), or FTTH (Fiber to the Home), or use wireless communication schemes, such as WLAN (Wireless LAN), Wi-Fi, Wibro, Wimax, HSDPA (High Speed Downlink Packet Access), LTE (Long Term Evolution), or LTE-A (LTE Advanced). In addition to the above communication schemes, any other communication scheme which is well known or to be developed may be used.

The terminal device 200 refers to a user device capable of transmitting and receiving various kinds of data to and from the content providing device 300 through the communication network 100, based on a user's manipulation.

The terminal device 200 is able to perform voice or data communication through the communication network 100, and may include a memory for storing a program and protocol for data transmission/reception and processing, a microprocessor for executing, operating and controlling various programs, and the like. In addition, the terminal device 200 may be implemented in various forms. For example, the terminal device 200 may be a mobile terminal such as a smart phone, a tablet PC, a personal digital assistant (PDA), a portable multimedia player (PMP), or an MP3 player, or be a stationary terminal such as a smart TV, a laptop computer, or a desktop computer. Besides, any other apparatus capable of transmitting and receiving data according to the present disclosure may be used as the terminal device 200 in embodiments.

Meanwhile, the terminal device 200 may transmit a request for content transmission to the content providing device 300 in response to a user input, and may receive requested content from the content providing device 300 in a streaming manner.

At this time, the content may be received in packet units, and the packet may be an MMT packet.

The content providing device 300 is a device for transmitting content, such as video stored therein or received from an external apparatus (not shown), to the terminal device 200 through the communication network 100

In order to stream such content to the terminal device 200, the content providing device 300 may transmit streaming content divided into packet units to the terminal device 200.

Meanwhile, such streaming content transmitted by the content providing device 300 may be delivered to the terminal device 200 via an NAT router.

One example is a case where the terminal device 200 is connected to the communication network 100 by using a home Wi-Fi or router.

In this case, the content providing device 300 transmits the streaming content by considering only an IP address of the NAT router. Therefore, when the content transmission is performed based on a user datagram protocol (UDP) type, a problem of NAT traversal is caused.

This will be described in detail with reference to FIG. 2.

Figure 2:
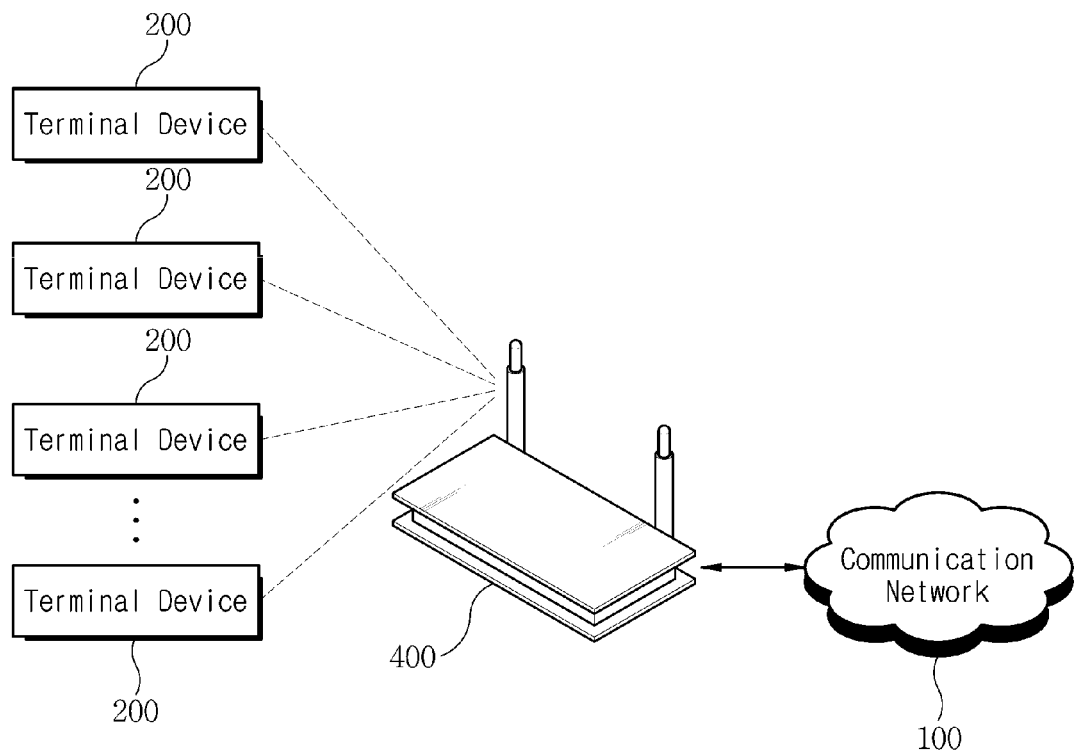

In FIG. 2, one or more terminal devices 200 are connected to the communication network 100 via an NAT router 400.

The network address translation (NAT) router 400 is an address translator of the communication network 100 used to convert a private IP address into a public IP address or vice versa. Allowing a public IP address to be used together, it is possible to save a limited public IP address. In addition, making only a public IP address known outside and using only a private IP address internally, it is possible to protect the internal network from attacks by external intruders.

For example, an NAT technique is applied to a home Wi-Fi AP or router to convert an IP of a terminal device used locally into a public IP assigned to the Wi-Fi AP or router, or is applied to an access point for accessing an external network (e.g., Internet) at the mobile communication network to convert a private IP address of a terminal device used in the mobile communication network into a public IP address.

In case of applying the NAT technique, typically a transmission control protocol (TCP) session has been used to provide streaming content to the terminal device 200. However, when content is provided through the TCP session, a considerable delay occurs in comparison with original content of the streaming service provider.

That is, in case of content such as sports broadcast that requires real-time provision, content data is not provided to the terminal device 200 in real time, but delayed for a certain time (e.g., 30 seconds).

This problem may be solved by providing content in a UDP scheme rather than providing the content through the TCP session. However, the use of the UDP scheme may arise the above-mentioned NAT traversal problem. That is, it is impossible to provide a low-delay content providing service to the terminal device 200 connected to the NAT router 400.

Therefore, in order to solve the above-described problems, the present disclosure proposes a method for providing a low-delay content providing service to the terminal device 200 without causing the NAT traversal problem by registering a UDP session between the content-requesting terminal device 200 and the content providing device 300 and providing content through the UDP session.

Now, the configurations and operating processes of the terminal device 200 and the content providing device 300 according to the present disclosure will be described.

In the following description, a first session connected between the terminal device 200 and the content providing device 300 may be a TCP session, and a second session may be a UDP session.

Similarly, a first communication scheme may be a TCP scheme, and a second communication scheme may be a UDP scheme.

Figure 3:
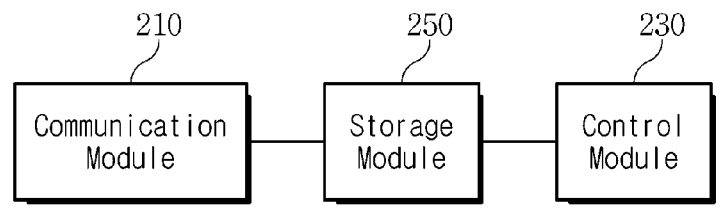
FIG. 3 is a block diagram illustrating a main configuration of a terminal device according to an embodiment of the present disclosure.
Figure 4:
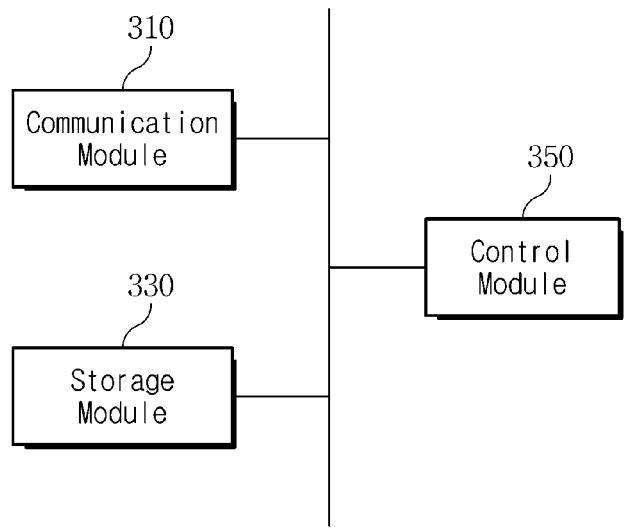
FIG. 4 is a block diagram illustrating a main configuration of a content providing device according to an embodiment of the present disclosure.

FIG. 3 is a block diagram illustrating the configuration of a terminal device 200 according to the present disclosure, and FIG. 4 is a block diagram illustrating the configuration of a content providing device 300 according to the present disclosure.

Referring to FIG. 3, the terminal device 200 may include a communication module 210, a storage module 230, and a control module 250.

The communication module 210 is configured to transmit and receive data to and from the content providing device 300 through the communication network 100. In addition, the communication module 210 may transmit a request for content through the first session or the second session, based on a user input, and receive the requested content. Also, the communication module 210 may transmit and receive session information for the registration of the second session.

The storage module 230 is configured to store content or session information received through the communication module 210.

The control module 250 is configured to control the overall operation of the terminal device 200 according to the present disclosure.

The operating process of the terminal device 200 controlled by the control module 250 will be described in detail with reference to FIG. 5 together with the operating process of the content providing device 300.

Although not shown in FIG. 3, the terminal device 200 according to the present disclosure may further include an input module (not shown) for receiving a user input, an output module (not shown) for reproducing content received from the content providing device 300, and the like.

Referring to FIG. 4, the content providing device 300 may include a communication module 310, a storage module 330, and a control module 350.

The communication module 310 is configured to transmit and receive data to and from the terminal device 200 through the communication network 100. In addition, the communication module 310 may receive a request for content from the terminal device 200 through the first session or the second session, and transmit the requested content. Also, the communication module 310 may transmit and receive session information for the registration of the second session.

The storage module 330 is configured to store data of various contents to be transmitted to the terminal device 200 through the communication module 310, and store session information for transmission of data through the second session with the terminal device 200.

The control module 350 is configured to control the overall operation of the content providing device 300 according to the present disclosure.

The operating process of the content providing device 300 controlled by the control module 350 will be described hereinafter in detail with reference to FIG. 5 together with the operating process of the terminal device 200.

Figure 5:
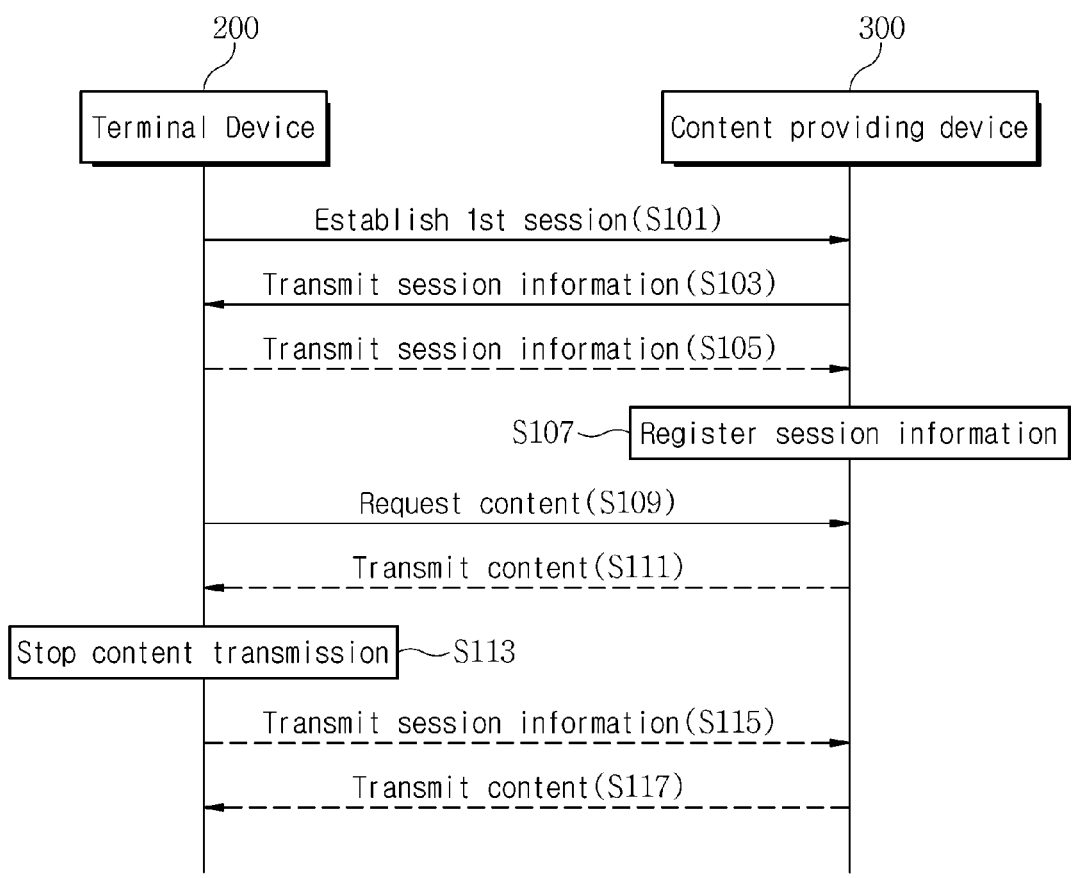
FIG. 5 is a data flow diagram illustrating a content providing method according to an embodiment of the present disclosure.

In FIG. 5, there are a solid line and a dotted line that indicate data transmission between the terminal device 200 and the content providing device 300. The solid line indicates data transmission through the first session, and the dotted line indicates data transmission through the second session.

For example, steps shown by solid lines may be implemented using the TCP session, and steps shown by dotted lines may be implemented using the UDP session.

In addition, in the description about FIG. 5, the first communication scheme may indicate the TCP scheme, and the second communication scheme may indicate the UDP scheme.

Referring to FIG. 5, at the outset, the terminal device 200 and the content providing device 300 establish the first session therebetween to transmit control information necessary for content transmission (S101).

For example, the control information may be a streaming content request message, a streaming content transmission stop message, a lost packet retransmission request message, or the like of the terminal device 200.

When the first session is established between the terminal device 200 and the content providing device 300, the content providing device 300 transmits session information thereof (i.e., first session information) required for content transmission to the terminal device 200 through the established first session (S103).

The first session information transmitted from the content providing device 300 to the terminal device 200 may include information, such as a session notification (SN) message, for providing content through the second session. FIG. 6 shows one embodiment of the syntax of the session notification message. As shown, the session notification message (SN) may contain at least one of a port number (port number), IP address information (IP_address), a session key (session_Key) for authentication of a session between the terminal device and the content providing device, content identification information, a packet group sequence number, packet ID information (Packet_id), a packet sequence number (Packet_sequence_number), protocol information (protocol), and retry indication information (retry_flag).

In case where the terminal device 200 and the content providing device 300 transmit content by using an MMT protocol, the content identification information may be asset ID information (asset_id), and the packet group sequence number may be an MPU sequence number (MPU_seq).

Now, each information contained in the session notification message will be described. The port number (port_number) may include a UDP port number transmission of a packet (or streaming content). The length of the port number field may be set to 32 bits.

The IP address information (IP_address) may include an IPv4 address of a transmitter transmitting a packet (or streaming content). The length of the IP address information field may be set to 32 bits.

The session key information may include a randomly generated key value to identify a session created or registered between the terminal device 200 and the content providing device 300. The length of the session key information field may be set to 32 bits.

The asset ID information, which is the content identification information, may include an identifier of an asset defined in the MMT.

The MPU sequence number (MPU_seq), which is the packet group sequence number, may refer to a sequence number of an MPU provided at the next MPU presentation time (mpu_presentation_time).

The packet ID information (Packet id) is an integer value assigned to each packet to distinguish packets included in each asset. In this case, the integer value is allocated based on a signaling message and an FEC parity flow.

The packet sequence number (Packet_sequence_number) is identification information for detecting a packet lost during transmission and requesting a packet retransmission, and may correspond to a packet sequence number of the first packet indicated by mask_byte.

The protocol information may include information about a protocol used for streaming data transmission, and the length of the protocol information field may be set to 16 bits.

The retry indication information (retry_flag) may include information about session continuity in a streaming session. That is, if the value of the retry indication information is set, it means that handover occurs in the terminal device 200 during streaming or the network connection is interrupted.

The length of the retry indication information field may be set to 1 bit.

The terminal device 200 that receives the session information containing the above information transmits session information thereof (i.e., second session information) to the content providing device 300 by using the second communication scheme, based on an IP address or port number included in the first session information (S105).

The second session information may have the same syntax as the first session information of the content providing device 300.

That is, the second session information and the first session information may contain the same kind information.

In other words, the session information of the terminal device 200 as well may contain at least one of a port number (port_number), IP address information (IP_address), a session key (session_Key) for authentication of a session between the terminal device and the content providing device, content identification information, a packet group sequence number, packet ID information (Packet id), a packet sequence number (Packet_sequence_number), protocol information (protocol), and retry indication information (retry_flag).

However, excluding the session key, the value of each information may be different from that of the session information of the content providing device 300.

For example, the port number and the IP address information contained in the first session information are those of the content providing device 300, whereas the IP address information contained in the second session information may be that of the terminal device 200.

The content providing device 300 that receives the second session information registers the received second session information, based on the second session information and the first session information (S107).

At this time, the content providing device 300 may compare a session key contained in the second session information with a session key contained in the first session information. Then, if two session keys are identical with each other, the content providing device 300 may register the second session information necessary for data transmission with the terminal device 200 in the second communication scheme.

The terminal device 200 transmits a request for streaming content to the content providing device 300 through the established first session (S109). Then, the content providing device 300 transmits the requested content to the terminal device 200 through the second session by using the registered second session information (S111).

Meanwhile, while the content providing device 300 transmits content to the terminal device 200, the content transmission may be stopped because of a handover caused by the movement of the terminal device 200 or because of the deterioration of a network environment (S113).

When the transmission of the requested content is stopped for a predetermined time, the terminal device 200 transmits the second session information to the content providing device 300 through the second session by using the session key, the IP address information, and the port number, which are contained in the first session information received at step S103, in order to continuously receive the requested content (S115). Then, using the session key, the IP address information, and the port number, which are contained in the received second session information, the content providing device 300 updates the registered second session information and transmits the stopped content to the terminal device 200 again (S117).

In this case, the content providing device 300 may retransmit the content from the point of time when the content transmission is stopped.

Meanwhile, the second session information transmitted at step S115 may contain the same value and information as those of the second session information transmitted at step S105, or may contain different value and information.

For example, when the content transmission is stopped because of a handover caused by the movement of the terminal device 200, the IP address information allocated to the terminal device 200 may be changed.

In this case, at step S115, the terminal device 200 changes the IP address information contained in the second session information and transmits the changed IP address information to the content providing device 300. Then, the content providing device 300 updates the second session information, based on the changed IP address information.

Meanwhile, the syntax of the session notification message described with reference to FIGS. 5 and 6 may be modified as shown in FIG. 7 according to another embodiment.

The syntax of the session notification message according to one embodiment of FIG. 6 may be insufficient for solving the NAT traversal problem on a heterogeneous mobile network. Therefore, the modified session notification message syntax according to another embodiment of FIG. 7 may be used.

Table 1 below describes parameters included in the modified session notification message syntax according to another embodiment of FIG. 7.

TABLE 1

| Parameter | Description |
|---|---|
| message_id | indicates the message ID. The length of this field is 16 bits. |
| version | indicates the version of the messages. MMT receiving entity may check whether the version of the received message is new or not. The length of this field is 8 bits. |
| length | indicates the length of the messages in bytes, counting from the beginning of the next field to the last byte of the SN message. The value "0" shall not be used for this field. |

TABLE 1-continued

| Parameter | Description |
| --- | --- |
| ip_addr_version | this field indicates the version of the IP address. |
| MMT_package_id | this field is a unique identifier of the Package that is being served. |
| MMT_package_id_length | the length in bytes of the MMT_package_id string, excluding the terminating null character. |
| MMT_package_id_byte | a byte in the MMT_package_id. When the MMT_package_id_byte is string, the terminating null character is not included in the string. |
| ipv4_src_addr | This field is the IPv4 address of the sender of the packet. The length of this field is 32 bits. |
| ipv6_src_addr | This field is the IPv6 address of the sender of the packet. The length of this field is 128 bits. |
| src_port | It indicates the sending port number. The length of this field is 16 bits. |

In the session notification message syntax according to another embodiment, the content identification information may be MMT package ID (MMT_package_id) information.

Among the above fields, the value of the ip_addr_version field indicating the version of an IP address may be defined as shown in Table 2 below.

TABLE 2

| Value | Description |
| --- | --- |
| 00 | MMTP packet flow over UDP/IP (version 4) |
| 01 | MMTP packet flow over UDP/IP (version 6) |
| 10~11 | reserved |

That is, although the IP address information indicates an IPv4 address in one embodiment, it may be an IPv4 address or an IPv6 address in another embodiment.

In addition, the modified session notification message syntax according to another embodiment of FIG. 7 further defines a mobile information descriptor (mobile_info_descriptor), which relates to information associated with the terminal device 100 and may be composed of parameters shown in Table 3 below.

TABLE 3

| Parameter | Description |
| --- | --- |
| descriptor_tag | a tag value indicating the type of this descriptor. |
| descriptor_length | indicates the length in bytes counting from the next byte after this field to the last byte of the descriptor. |
| MSISDN_flag | indicates whether MSISDN is included or not. If it is set to '1', the descriptor is included. |
| IMSI_flag | indicates whether IMSI is included or not. If it is set to '1', the descriptor is included. |
| current_cell_id_flag | indicates whether current_cell_ID is included or not. If it is set to '1', the descriptor is included. |
| MSISDN | indicates MSISDN (Mobile Subscriber International Subscriber Directory Number) number of MMT receiving entity. The length of this field is 15 decimal digits, which is coded into 60 binary digits where each decimal digit is assigned 4 binary bits. |
| IMSI | indicates IMSI (International Mobile Subscriber Identity) number of MMT receiving entity. The length of this field is 15 decimal digits, which is coded into 60 binary digits where each decimal digit is assigned 4 binary bits. |
| current_cell_id | indicates current cell ID (CGI for 2G/3G and eCGI for 4G). It is assigned a 15 decimal digit code which corresponds to totally 60 bits where 4 bits are assigned for each 1 decimal digit. |

In case of the session notification message syntax according to one embodiment, the packet group sequence number, the packet ID information, the packet sequence number, the protocol information, and the retry indication information are called together whenever the session notification message is called. However, in another embodiment, the port number (src_port), the IP address version information (ip_addr_version), the content identification information (MMT_package_id), and the mobile information descriptor (mobile_info_descriptor) are called.

That is, in another embodiment, the mobile information descriptor containing detailed information of the terminal device 200 such as identification information of the terminal device 200, e.g., MSISDN or IMSI, is used. When the mobile information descriptor is called, the information contained in the mobile information descriptor may be called together or not, depending on flag information. For example, when MSISDN information, which is identification information of the terminal device 200, is required, the value of MSISDN flag is set to 1. By setting the flag value to 1 through the mobile information descriptor only when the corresponding information is required, it is possible to reduce the length of the message syntax. Therefore, the session notification message syntax according to another embodiment may have smaller transmission traffic and a more reduced delay time than the session notification message syntax according to one embodiment has.

In addition, according to another embodiment of the present disclosure, when the content transmission is stopped because of a handover caused by the movement of the terminal device 200 or because of the deterioration of a network environment, the terminal device 200 transmits the session information thereof to the content providing device 300 through the registered second session by using the identification information thereof, the IP address information according to the IP address version information, and the port number, which are contained in the session information. Then, the content providing device 300 updates the registered second session information by using the identification information, the IP address information, and the port number contained in the received session information of the terminal device 200, and transmits the stopped content to the terminal device 200 again.

Meanwhile, the second session information transmitted for update of the second session information at step S115 may contain the same value and information as those of the second session information transmitted at step S105, or may contain different value and information.

For example, when the content transmission is stopped because of a handover caused by the movement of the terminal device 200, the IP address information allocated to the terminal device 200 may be changed.

In this case, at step S115, the terminal device 200 changes the IP address information contained in the second session information and transmits the changed IP address information to the content providing device 300. Then, the content providing device 300 updates the second session information, based on the changed IP address information.

That is, in one embodiment, when registering the second session information between the terminal device 200 and the content providing device 300, and when updating the registered second session information due to a handover or the like, the session key is used for session authentication. However, in another embodiment, the identification information of the terminal device 200, such as the MSISDN information or the IMSI information contained in the mobile information descriptor, may be used.

Meanwhile, as described above, the content providing device 300 transmits content data to the terminal device 200 in packet units. In an embodiment of the present disclosure, the packet may be an MMT packet as mentioned above. This MMT packet structure will be described with reference to FIG. 8.

Figure 8:
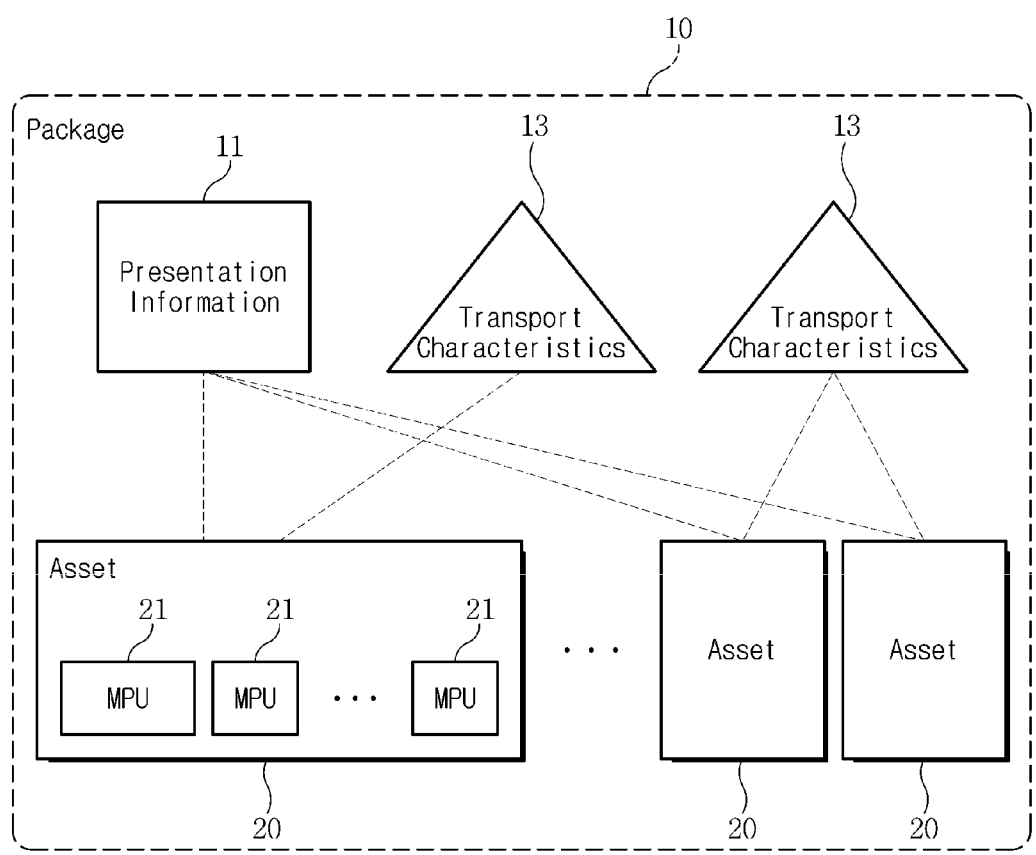
FIG. 8 is a diagram illustrating an MMT packet structure according to an embodiment of the present disclosure.

Referring to FIG. 8, an MMT package 10 is the largest logically structured MMT entity among data models defined in an MMT function area, and refers to one independent content such as a movie. The content providing device 300 that provides streaming content such as a video is capable of generating the MMT package and providing the generated MMT package to the terminal device 200. The MMT package 10 may be a logically structured collection composed of several elements. Specifically, the MMT package 10 may include one or more assets 20, presentation information 11, transport characteristics 13, and descriptive information, e.g., package information.

The presentation information 11 includes information about a relationship, namely, a spatial and temporal relationship, between the assets 20. When one content is composed of a plurality of MMT packages, the presentation information 11 may further include information for indicating a relationship between the MMT packages. A combination of a hypertext markup language (HTML) and a composition information document is one example of the presentation information 11.

The transport characteristics 13, also referred to as asset delivery characteristics (ADC), represent quality of service (QoS) requirements and statistics for delivery of the assets 20. The assets 20 may be associated with one of the transport characteristics 13. In this case, the transport characteristics (ADC) 13 may be used to set up parameters of MMT payload and MMT protocol by an entity that encapsulates the package for effective delivery of the assets 20. In addition, the transport characteristics 13 may include delivery characteristic information, such as a traffic description parameter and a QoS descriptor, needed to determine a delivery condition of the MMT assets 20 or MMT packets. This delivery characteristic information may be expressed in the form of parameters irrespective of a network environment.

The asset 20 refers to the largest logical data unit, meaning an element of the package that encapsulates encoded media data such as audio, video, or web page having a timed or non-timed attribute. In addition, the asset 20 indicates a data entity that contains data with the same delivery characteristics. That is, while the MMT package 10 is the largest entity among data models defined in the MMT function area and indicates one independent content such as a movie, the asset 20 indicates a data unit, such as audio data, video data, or script data, forming the MMT package 10. The asset 20 logically groups MPUs that share the same asset ID.

In addition, the MMT packet of the present disclosure may be substantially composed of an MMT packet header and an MMT payload.

While the specification contains many specific implementation details, these should not be construed as limitations on the scope of any disclosure or of what may be claimed, but rather as descriptions of features that may be specific to particular embodiments of particular disclosures.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

This disclosure shows the best mode of the disclosure and provides examples to illustrate the disclosure and to enable a person skilled in the art to make and use the disclosure. The present disclosure is not limited by the specific terms used in the disclosure. Based on the present disclosure, one of ordinary skill in the art can modify, alter, or change the disclosure without departing from the scope of the disclosure.

Accordingly, the scope of the present disclosure should not be limited by embodiments described in the disclosure but should be defined by the appended claims.

The present disclosure relates to a content transmission method and apparatus for a streaming service. Particularly, the present disclosure relates to a content transmission method and apparatus capable of providing a low-delay broadcast service even to a user using a home Wi-Fi or router based on NAT technology through an adaptive content transmission scheme according to a network type of provides a streaming service.

According to the present disclosure, a session key and UDP port information for content transmission in a UDP scheme are transmitted and received through a TCP session, and then a UDP session is generated between a terminal device and a content providing device. In addition, streaming content requested by the terminal device is provided through the generated UDP session. Therefore, it is possible to provide streaming content without a delay even in a heterogeneous mobile network environment that utilizes NAT technology.

Accordingly, the present disclosure can contribute to the development of the streaming service industry. Also, the present disclosure has a good possibility of sales on the market or business and therefore has industrial applicability suitable for practical and apparent implementation.

What is claimed is:

1. A content providing method of a content providing device for providing a streaming service to a terminal device, the method comprising:

establishing a first session in a first protocol between the content providing device providing the streaming service and the terminal device;

transmitting, by the content providing device, first session information to the terminal device through the first session in the first protocol, the first session information including a first session key;

receiving, by the content providing device, second session information for a second protocol from the terminal device through the second session, the second protocol different from the first protocol, the second session information including a second session key;

determining, by the content providing device, whether the first session key of the first session information matches the second session key in the second session information; and providing, by the content providing device, requested content to the terminal device through the second session in the second protocol at a first time responsive to determining that the first session key of the first session information matches the second session key in the second session information, wherein the first session is a transmission control protocol (TCP) session for transmission of control information required for content transmission, and the second session is a user datagram protocol (UDP) session for the content transmission.

2. The method of claim 1, wherein the session information contains at least one of a port number, IP address information, content identification information, a packet group sequence number, packet ID information, a packet sequence number, protocol information, and retry indication information.

3. The method of claim 2, wherein providing the requested content includes:

providing the content composed of an MPEG media transport (MMT) packet including at least one media fragment unit (MFU), which is a minimum decoding unit contained in a payload of the packet, or at least one media processing unit (MPU) which includes the at least one MFU, and wherein the content identification information indicates asset ID information or package ID information, and the packet group sequence number indicates an MPU sequence number.

4. The method of claim 1, further comprising:

stopping transmission of the requested content at the content providing device responsive to elapsing of a predetermined time after providing of the requested content;

receiving the second session information from the terminal device at a second time subsequent to the first time responsive to stopping the transmission of the requested content; and resuming providing of the requested content to the terminal device responsive to receiving the second session information at the second time.

5. A content receiving method of a terminal device for receiving a streaming service from a content providing device, the method comprising:

establishing, by the terminal device, a first session in a transmission control protocol (TCP) with the content providing device to transmit control information required for content transmission;

receiving, by the terminal device, first session information from the content providing device through the first session in the TCP protocol, the first session information including a session key;

generating, by the terminal device, second session information to include the session key;

transmitting the second session information to the content providing device through a second session in a user datagram protocol (UDP);

receiving requested content from the content providing device through the second session in the UDP responsive to transmitting the second session information.

6. A content providing device for providing a streaming service to a terminal device, the content providing device comprising:

a processor;

a communication circuit configured to transmit and receive data to and from the terminal device via a communication network; and memory storing instructions thereon, the instructions when executed by the processor cause the processor to:

establish a first session in a transmission control protocol (TCP) with the terminal device for transmission of control information required for content transmission;

transmit first session information to the terminal device through the first session in the TCP protocol, the first session information including a first session key, receive second session information for a user datagram protocol (UDP) from the terminal device through the second session for content transmission, the second session information including a second session key;

determining whether the first session key of the first session information matches the second session key in the second session information, provide requested content to the terminal device through the second session in the UDP protocol responsive to determining that the first session key of the first session information matches the second session key in the second session information.

* * * * *